US006053994A

United States Patent [19]
Saleh et al.

[11] Patent Number: 6,053,994

[45] Date of Patent: Apr. 25, 2000

[54] COPPER ALLOY WIRE AND CABLE AND METHOD FOR PREPARING SAME

[75] Inventors: Joseph Saleh, Morristown; Eric Fisk, Saddle River, both of N.J.

[73] Assignee: Fisk Alloy Wire, Inc., Hawthorne, N.J.

[21] Appl. No.: 08/928,844

[22] Filed: Sep. 12, 1997

[51] Int. Cl.[7] .............................. C22C 9/00; H01B 1/02; B60M 1/30

[52] U.S. Cl. ............................................ 148/432; 148/433

[58] Field of Search .................................... 148/432, 433, 148/434, 435, 436; 428/671; 420/469, 492; 337/140, 395; 313/343

[56] References Cited

U.S. PATENT DOCUMENTS

| | | | |
|---|---|---|---|
| 2,025,662 | 12/1935 | Hensel et al. | 420/492 |
| 3,143,442 | 8/1964 | Watts | 148/686 |
| 4,067,750 | 1/1978 | Mravic et al. | 148/554 |
| 4,224,066 | 9/1980 | Watson et al. | 75/153 |
| 4,451,430 | 5/1984 | Matidori et al. | 420/492 |
| 4,594,116 | 6/1986 | Inagaki | 148/536 |
| 4,717,436 | 1/1988 | Hosoda et al. | 148/432 |
| 4,727,002 | 2/1988 | Inagaki | 428/671 |
| 4,755,235 | 7/1988 | Matidori et al. | 148/411 |
| 4,872,048 | 10/1989 | Akutsu et al. | 357/67 |
| 4,911,769 | 3/1990 | Yamada et al. | 148/430 |
| 4,981,514 | 1/1991 | Sukekawa et al. | 75/652 |
| 5,062,614 | 11/1991 | Sukekawa et al. | 266/216 |
| 5,074,921 | 12/1991 | Gravemann | 420/477 |
| 5,205,878 | 4/1993 | Kanzaki et al. | 148/684 |
| 5,306,465 | 4/1994 | Caron et al. | 420/492 |
| 5,486,244 | 1/1996 | Caron et al. | 148/554 |
| 5,565,045 | 10/1996 | Caron et al. | 148/432 |

*Primary Examiner*—Sikyin Ip
*Attorney, Agent, or Firm*—Bachman & LaPointe, P.C.

[57] ABSTRACT

High strength, high conductivity copper alloy wire and a cable therefrom and method for manufacturing same, wherein the copper alloy contains chromium from 0.15–1.30%, zirconium from 0.01–0.15% and the balance essentially copper. The alloy wire is heat treated, cold worked to an intermediate gage, heat treated, cold worked to final gage, and finally heat treated. A major portion of the chromium and zirconium are present as precipitated, sub-micron sized particles in a copper matrix. In addition, the wire has a gage of 0.010 inch or less and a tensile strength of at least 55% ksi, an electrical conductivity of at least 85% IACS, and a minimum elongation of 6% in 10".

14 Claims, 2 Drawing Sheets

COPPER ALLOY WIRE AND CABLE AND METHOD FOR PREPARING SAME

BACKGROUND OF THE INVENTION

The present invention relates to a high strength, high conductivity copper alloy wire or cable and a method for manufacturing same, wherein the copper alloy wire consists essentially of from 0.15–1.30% chromium, from 0.01–0.15% zirconium, balance essentially copper.

Copper alloys are the natural choice for conductor wire alloys due to their high electrical conductivity. In fact, commercially pure copper is the most widely used conductor. High performance conductor alloys are required where the properties of copper are not sufficient for a particular application. Thus, in addition to electrical conductivity these alloys must often meet a combination of often conflicting properties. These properties may include strength, ductility, softening resistance and flex life. Indeed, ASTM B624 describes the requirements for a high strength, high conductivity copper alloy wire for electrical applications. These specifications require the alloy to have a minimum tensile strength of 60 ksi, a minimum electrical conductivity of 85% IACS with an elongation of 7–9%. U.S. military specifications for high strength copper alloy cables require a minimum elongation of 6% and a minimum tensile strength of 60 ksi.

Alloying elements may be added to copper to impart strength beyond what can be achieved by cold work. However, if such elements dissolve in the matrix they rapidly reduce the electrical conductivity of the alloy. U.S. Pat. Nos. 4,727,002 and 4,594,116 show high strength, high conductivity copper alloy wire including specific alloying additions.

It is, therefore, desirable to develop a high strength, high conductivity copper alloy wire and a cable therefrom at a reasonable cost and in a commercially viable procedure.

Further objectives of the present invention will appear hereinafter.

SUMMARY OF THE INVENTION

It has now been found that the foregoing objectives can be readily obtained in accordance with the present invention.

The present invention provides a method for manufacturing high strength, high conductivity copper alloy wire and a cable therefrom. The method comprises: providing a copper alloy wire having a gage of 0.25 inch or less and consisting essentially of chromium from 0.15–1.30%, zirconium from 0.01–0.15%, balance essentially copper; first heat treating said wire for at least one-third of a minute at a temperature of 1600–1800° F. after which a controlled cooling is generally employed, e.g., quench or slow interrupted cooling; followed by first cold working, preferably drawing, said alloy to an intermediate gage of 0.030–0.125 inch; followed by second heat treating said alloy for 15 minutes to 10 hours at 600–1000° F.; followed by a second or final cold working, preferably drawing, said alloy to final gage of 0.010 inch or less; and finally heat treating said alloy for 15 minutes to 10 hours at 600–1000° F.

If desired, additional steps may be employed, as after the second heat treating step but before the final cold working step, one can cold work, preferably draw, to a gage of greater than 0.03 inch, followed by heat treating, as for example, for less than one minute.

The high strength, high conductivity copper alloy wire of the present invention comprises: a copper alloy consisting essentially of chromium from 0.15–1.30%, zirconium from 0.01–0.15%, balance essentially copper; said wire having a gage of 0.010 inch or less; wherein a major portion of the chromium, and zirconium are present as precipitated, submicron sized particles in a copper matrix; and wherein said wire has a tensile strength of at least 55 ksi, an electrical conductivity of at least 85% IACS, and a minimum elongation of 6%.

Desirably, the copper alloy wire of the present invention has a tensile strength of at least 60 ksi, an electrical conductivity of at least 90% IACS, and a minimum elongation of 7%, and optimally a minimum elongation of at least 9%.

It is particularly desirable to provide a multi-stranded copper alloy cable of the copper alloy wire of the present invention, with from 2–400 strands of from 0.001–0.008 inch wire, preferably from 0.002–0.007 inch wire. Each of the fine wires in the cable is preferably coated for corrosion resistance, as preferably silver or nickel plated.

The multi-stranded conductor cable of the present invention is highly advantageous, for example, it has good conductivity, strength, elongation and fatigue life. It has good high temperature stability to allow a variety of coatings to be applied for particular applications.

Further features of the present invention will appear hereinbelow.

BRIEF DESCRIPTION OP THE DRAWINGS

The present invention will be more readily understood from a consideration of the accompanying drawings, wherein:

FIG. 1 is a graph of elongation versus strength of an alloy of the present invention processed in accordance with the present invention and the same alloy processed differently; and FIG. 2 is a graph of elongation versus strength of an alloy of the present invention processed in accordance with the present invention.

DETAILED DESCRIPTION OF PREFERRED EMBODIMENTS

Figure 1:
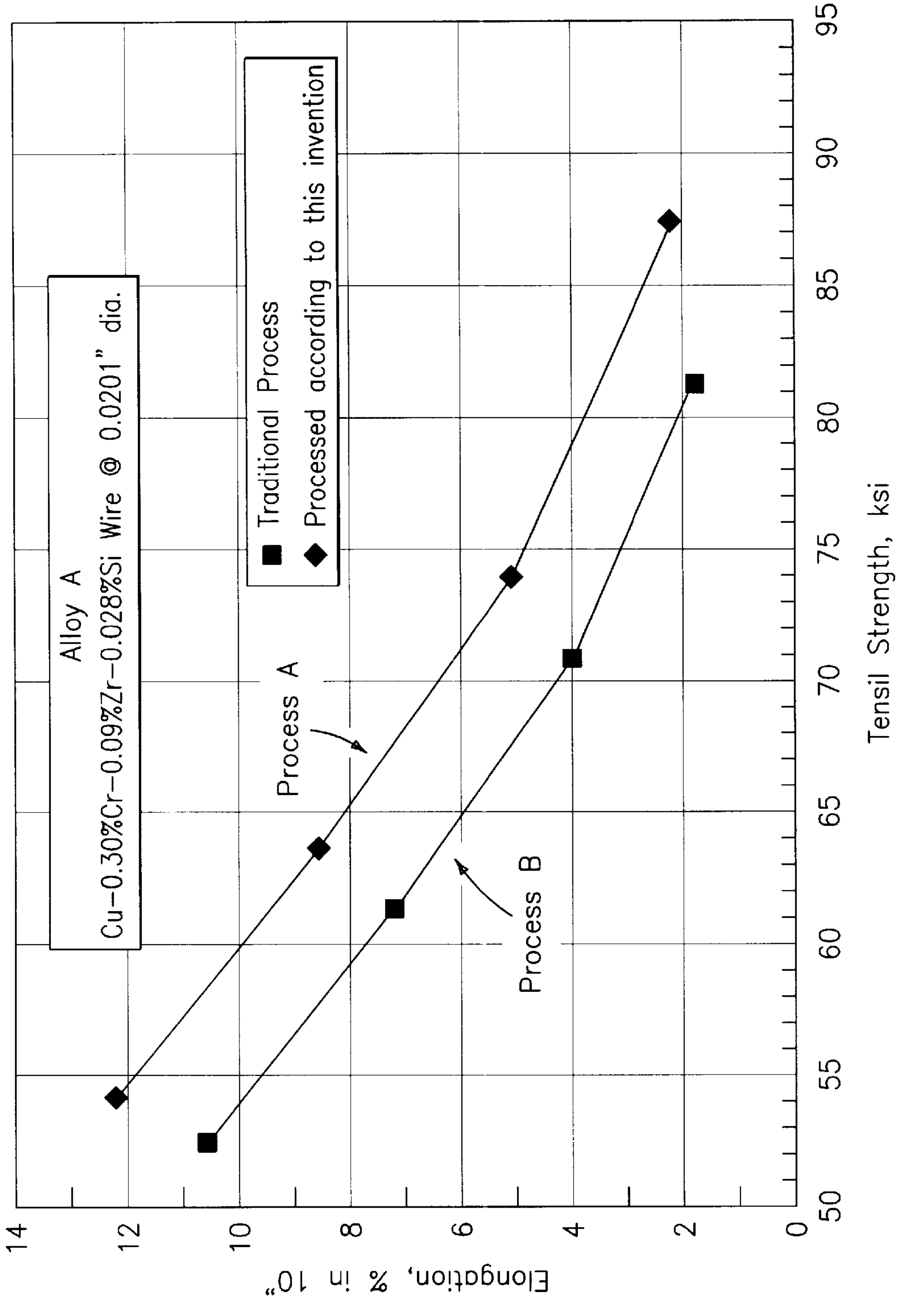

In accordance with the present invention, the copper alloy wire contains chromium from 0.15–1.30%, zirconium from 0.01–0.15%, and the balance essentially copper. In particular, the following are desirable:

(1) chromium—0.15–0.50%,
zirconium—0.05–0.15%,
copper—essentially balance;

(2) chromium—0.50–1.30%,
zirconium—0.01–0.05%,
copper—essentially balance.

In addition, the copper alloy wire of the present invention may contain small amounts of additional alloying ingredients for particular purposes, as for example silicon, magnesium and/or tin, generally up to 0.1% each and as low as 0.001% each.

Throughout the present specification, all percentages are by weight.

In addition, a major portion of the chromium and zirconium are present as precipitated, sub-micron sized particles in a copper matrix. The precipitates in the matrix in the present invention strengthen the alloy without a great sacrifice to electrical conductivity due to the processing of the present invention. Thus, the present invention takes advantage of the alloying elements, the form thereof in the matrix and the synergistic effect that the combination of these two elements provides.

The distribution of the particles is substantially uniform throughout the copper matrix and has a significant effect on elongation of the copper alloy wire of the present invention, especially in smaller wire diameters.

Traditionally, age hardenable copper alloy wire is processed by solution treating in the single phase region and quench to produce a super saturated solid solution, cold work (preferably draw), and age. In a copper alloy wire where both high strength and high electrical conductivity are required, the final aging step is expected to concurrently increase both the strength and electrical conductivity of the alloy. However, disadvantageously, as aging proceeds the electrical conductivity continues to increase while strength, following an initial increase, reaches a maximum and then decreases with continued aging. Thus, the maximum in strength and electrical conductivity do not coincide.

In accordance with the present invention, the aforesaid copper alloy wire obtains an excellent combination of strength, electrical conductivity and elongation in accordance with the processing of the present invention.

In accordance with the present invention, the copper alloy wire is subjected to a first heat treatment step for at least one-third of a minute at a temperature of 1600–1800° F., generally for one-half of a minute to 2 hours, to solutionize the alloy, i.e., to attempt to get a portion of the alloying additions, and desirably the major portion, into solution. This first annealing step could be a strand or batch anneal and is generally conducted on the wire at a gage of 0.08–0.25 inch. Desirably, the wire is quenched after the heat treatment.

The alloy wire is then cold worked, generally drawn, in a first cold working step to an intermediate gage of 0.030–0.125 inch, and preferably to a gage of 0.040–0.080 inch.

The alloy wire is then given a second heat treatment for 15 minutes to 10 hours at 600–1000° F., preferably for 30 minutes to 4 hours, to precipitate the chromium and zirconium. The electrical conductivity of the alloy following this step is generally a minimum of 85% IACS and preferably a minimum of 90% IACS.

The alloy wire is then given a second cold working step, generally drawn, preferably to final gage of 0.010 inch or less, especially when used as strands in a cable.

If desired, other cycles can be interposed in the above process, as for example after the second heat treatment step but before the final cold working step, one can desirably cold work, generally draw, to a gage of greater than 0.03 inch, followed by heat treating for one-third of a minute to 10 hours at temperatures of between 600 & 1400° F.

After the second cold working step, the alloy is finally heat treated for 15 minutes to 10 hours at 600–1000° F.

The second heat treatment step ages the alloy wire to provide the desired electrical conductivity. This may require overaging beyond the peak tensile strength. The final heat treatment step obtains the desired combination of tensile strength and elongation, and also restores the electrical conductivity lost in the second cold working step.

The alloys of the present invention advantageously can be drawn to fine and ultrafine gage sizes appropriate for stranded conductor applications and are particularly advantageous when used in multi-stranded conductor cable applications, plated or unplated. Regardless of whether the alloy wire has been aged or in solution treated condition, these alloys can be drawn to greater than 99% reduction in area. As shown in ASTM B624, elongation of fine wire is generally less than larger gage wire. The alloys of the present invention show good elongation even at small gages.

The present invention and improvements resulting therefrom will be more readily apparent from a consideration of the following exemplifcative examples.

EXAMPLE 1

This example utilized a copper alloy wire having the following composition:

chromium—0.30%, zirconium—0.09%, silicon—0.028%, copper—essentially balance.

The starting material was copper alloy wire having a gage of 0.102 inch and conductivity of 77% IACS, processed by solution treatment at 0.170 inch, then drawn to 0.102 inch.

The alloy was processed under various conditions as shown in Table I, below, with properties also shown below.

TABLE I

| Sample | Condition | Diameter Inch | Tensile Strength ksi | Elongation % in 10 inches | Elec. Cond. % IACS |
|---|---|---|---|---|---|
| (1) | As drawn | 0.045 | 73.0 | — | — |
| (2) | Cond.(1) + heat treat 2 hrs-750° F. | 0.045 | 64.5 | 3.6 | 82.5 |
| (3) | As drawn | 0.020 | 81.3 | 1.8 | — |
| (4) | Cond. (3) + heat treat 2 hrs-750° F. | 0.020 | 70.8 | 4.0 | 83.8 |
| (5) | Cond.(3) + heat treat 2 hrs-850° F. | 0.020 | 61.2 | 7.2 | 92.9 |
| (6) | Cond.(3) + heat treat 2 hrs-950° F. | 0.020 | 52.3 | 10.6 | 95.1 |
| (7) | Cond.(2) + drawn | 0.020 | 87.4 | 2.2 | — |
| (8) | Cond. (7) + heat treat 2 hrs-750° F. | 0.020 | 73.8 | 5.1 | 89.3 |
| (9) | Cond. (7) + heat treat 2 hrs-850° F. | 0.020 | 63.4 | 8.6 | 93.7 |
| (10) | Cond. (7) + heat treat 2 hrs-950° F. | 0.020 | 54.0 | 12.2 | 95.0 |

The alloy aged at the intermediate gage at 0.045 inch, followed by drawing and aging, i.e., samples 8–10, attains higher electrical conductivity and tensile strength than the alloy aged at finish size only, i.e., samples 4–6. As shown in FIG. 1, the wire processed according to the present invention, Process A, at the same strength, also has a higher elongation than the conventionally processed wire of Process B. The conventionally processed alloy wire of Process B was solution treated, cold drawn and aged.

EXAMPLE 2

This example utilized a copper alloy wire having the following composition:

chromium—0.92%, zirconium—0.014%, copper—essentially balance.

The starting material was copper alloy wire having a gage of 0.102 inch and 87% IACS, having been solution treated, drawn to 0.102 inch, and aged.

The alloy was processed under various conditions as shown in Table II, below, with properties also shown below.

TABLE II

| Sample | Condition | Diameter Inch | Tensile Strength ksi | Elongation % in inches | Elec. Cond. % IACS |
|---|---|---|---|---|---|
| (11) | As drawn | 0.050 | 89.6 | — | 82.1 |
| (12) | Cond. (11) + heat treat 2 hrs-850° F. | 0.050 | 68.4 | 8.8 | 90.5 |
| (13) | As drawn | 0.025 | 94.9 | 2.5 | 78.4 |
| (14) | Cond. (13) + heat treat 2 hrs-650° F. | 0.025 | 80.6 | 4.5 | 84.4 |
| (15) | Cond. (13) + heat treat 2 hrs-750° F. | 0.025 | 70.6 | 6.3 | 89.6 |
| (16) | Cond. (13) + heat treat 2 hrs-850° F. | 0.025 | 61.2 | 10.6 | 92.7 |
| (17) | Cond. (13) + heat treat 2 hrs-950° F. | 0.025 | 52.4 | 16.9 | 95.1 |
| (18) | Cond. (12) + drawn | 0.025 | 89.4 | 1.7 | 88.1 |
| (19) | Cond. (18) + heat treat 2 hrs-650° F. | 0.025 | 79.7 | 3.4 | 91.1 |
| (20) | Cond. (18) + heat treat 2 hrs-750° F. | 0.025 | 71.0 | 6.1 | 93.0 |
| (21) | Cond. (18) + heat treat 2 hrs-850° F. | 0.025 | 60.6 | 10.1 | 94.2 |
| (22) | Cond. (18) + heat treat 2 hrs-950° F. | 0.025 | 51.3 | 18.1 | 95.1 |

Figure 2:
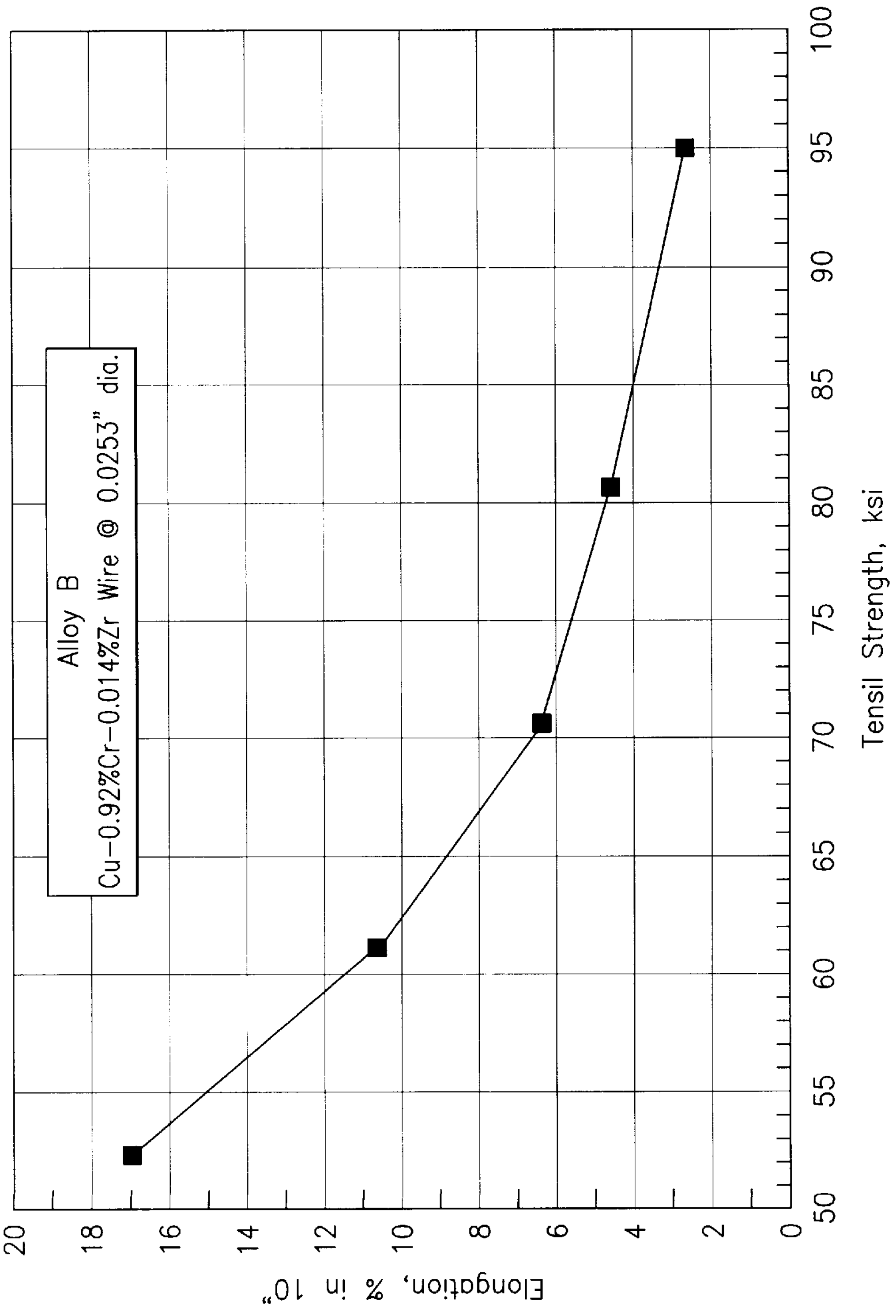

The results indicate that the wire aged at 0.050 inch diameter followed by drawing and aging at finish achieves higher electrical conductivity. FIG. 2 illustrates elongation versus strength. The wire of the present invention processed according to the present invention shows an excellent combination of strength, conductivity and elongation.

EXAMPLE 3

This example utilized a copper alloy wire having the following composition:

chromium—0.92%, zirconium—0.016%, copper—essentially balance.

The wire was drawn and aged at 0.102 inch diameter. The wire was then drawn to 0.020 to 0.010 inch diameter. The wire could easily be drawn to 0.010 inch diameter without any problems. Tensile properties and electrical conductivity of the aged wire are listed in Table III, below. In all cases, the aged wire showed an electrical conductivity of greater than 90% IACS, with an excellent combination of tensile strength and elongation.

TABLE III

| Sample | Diameter Inch | Temperature ° F. | Time hr. | Tensile ksi | Elongation % in 10 inches | Elec. Cond. % IACS |
|---|---|---|---|---|---|---|
| (23) | 0.020 | 850 | 1 | 72.7 | 5 | 93.6 |
| (24) | 0.018 | 850 | 1 | 72.6 | 6 | 94.6 |
| (25) | 0.016 | 850 | 1 | 72.2 | 6 | 94.4 |
| (26) | 0.014 | 850 | 1 | 72.0 | 6 | 94.9 |
| (27) | 0.013 | 850 | 1 | 71.3 | 6 | 94.2 |
| (28) | 0.011 | 850 | 1 | 71.9 | 6 | 94.0 |
| (29) | 0.010 | 850 | 1 | 70.9 | 6 | 94.5 |
| (30) | 0.020 | 900 | 1 | 62.2 | 9 | 94.6 |
| (31) | 0.018 | 900 | 1 | 61.0 | 10 | 95.8 |
| (32) | 0.016 | 900 | 1 | 60.9 | 11 | 95.6 |
| (33) | 0.014 | 900 | 1 | 61.9 | 11 | 96.0 |
| (34) | 0.013 | 900 | 1 | 61.6 | 11 | 96.3 |
| (35) | 0.011 | 900 | 1 | 62.0 | 11 | 95.9 |
| (36) | 0.010 | 900 | 1 | 60.3 | 11 | 95.3 |

EXAMPLE 4

The alloy of Example 3, copper—0.92% chromium—0.016% zirconium, was initially solution treated, drawn to 0.102 inch diameter and aged. The wire was then drawn to 0.040 inch diameter and heat treated at 1350° F. for ⅓ minute. This heat treatment softens the alloy without greatly influencing the electrical conductivity. This wire was then silver plated, drawn to 0.005 inch diameter and stranded to a 24 AWG or 19/36 construction. The stranded conductor was finally heat treated at 720° F. for 3 hours. The properties of the stranded conductor are as follows:

Tensile strength, ksi—59.4

Elongation, % in 10 inches—15.6

Electrical Conductivity, % IACS—87

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A copper alloy wire having high strength and high conductivity, which comprises: a solution heat treated and aged copper alloy consisting essentially of chromium from 0.15–1.30%, zirconium from 0.01–0.15%, balance copper; said wire having a gage of 0.010 inch or less; wherein a major portion of the chromium and zirconium are present as precipitated, sub-micron sized particles in a copper matrix, wherein said particles are substantially uniformly distributed in a copper matrix; and wherein said wire has a tensile strength of at least 55 ksi, an electrical conductivity of at least 85% IACS, and a minimum elongation of 6% in ten inches.

2. A copper alloy wire according to claim 1, wherein said wire is heat treated, cold worked to an intermediate gage, heat treated, cold worked to final gage, and finally heat treated.

3. A copper alloy wire according to claim 1, wherein said wire has a tensile strength of at least 60 ksi, an electrical conductivity of at least 90% IACS, and a minimum elongation of 7%.

4. A copper alloy wire according to claim 1, wherein said alloy contains at least one of silicon, magnesium and tin in an amount of from 0.001 to 0.1% each.

5. A copper alloy wire according to claim 1, wherein said copper alloy contains chromium from 0.15–0.50%, zirconium from 0.05–0.15%, and the balance copper.

6. A copper alloy wire according to claim 1, wherein said copper alloy contains chromium from 0.50–1.30%, zirconium from 0.01–0.05%, and the balance copper.

7. A multi-stranded copper alloy cable having high strength and high conductivity, which comprises: 2 to 400 strands of a solution heat treated and aged copper alloy wire consisting essentially of chromium from 0.15–1.30%, zirconium from 0.01–0.15%, balance copper; each of said wires having a gage of 0.001–0.008 inch; wherein a major portion of the chromium and zirconium are present as precipitated, sub-micron sized particles in a copper matrix, wherein said particles are substantially uniformly distributed in a copper matrix; and wherein said strands have a tensile strength of at least 55 ksi, an electrical conductivity of at least 85% IACS, and a minimum elongation of 6% in ten inches.

8. A copper alloy cable according to claim 7, wherein each of said strands is heat treated, cold worked to an intermediate gage, heat treated, cold worked to final gage, and finally heat treated.

9. A copper alloy cable according to claim 7, wherein said strands have a tensile strength of at least 60 ksi, an electrical conductivity of at least 90% IACS, and a minimum elongation of 7%.

10. A copper alloy cable according to claim 7, wherein said strands contain at least one of silicon, magnesium and tin in an amount of from 0.001 to 0.1% each.

11. A copper alloy cable according to claim 7, wherein said strands contain chromium from 0.15–0.50%, zirconium from 0.05–0.15%, and the balance copper.

12. A copper alloy cable according to claim 7, wherein said strands contain chromium from 0.50–1.30%, zirconium from 0.01–0.05%, and the balance copper.

13. A copper alloy cable according to claim 7, wherein said particles are substantially uniformly precipitated in a copper matrix.

14. A copper alloy according to claim 7, wherein each wire is coated with a material selected from the group consisting of silver and nickel.

* * * * *